April 13, 1954     V. G. VAUGHAN     2,675,267
THERMOSTATIC ELEMENT
Filed March 29, 1952
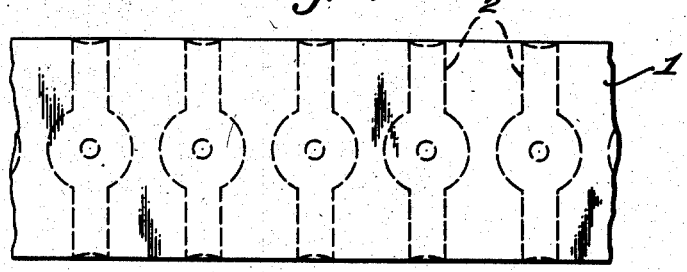
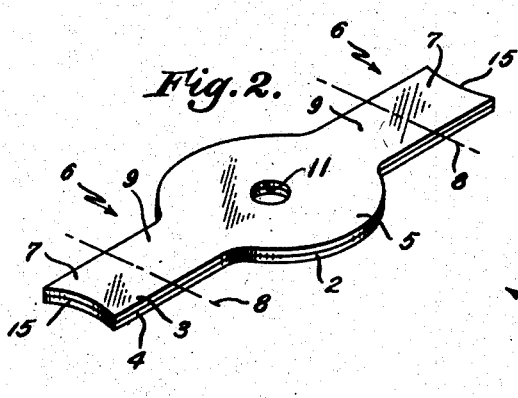 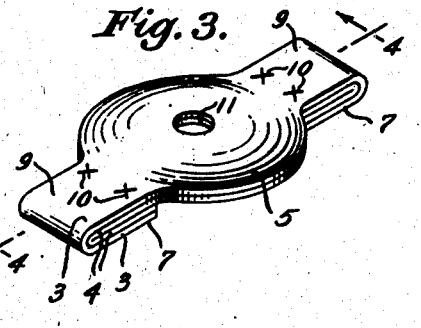
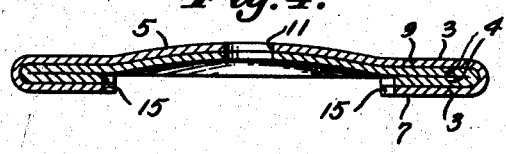 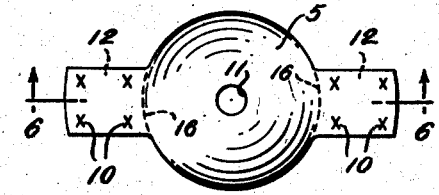
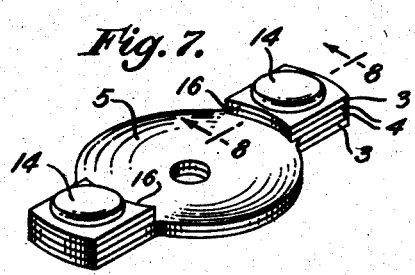
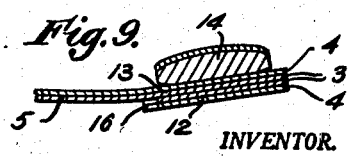
INVENTOR.
Victor G. Vaughan,
BY
Townsend M. Gunn.
Att'y.

Patented Apr. 13, 1954

2,675,267

UNITED STATES PATENT OFFICE 2,675,267

THERMOSTATIC ELEMENT

Victor G. Vaughan, Attleboro, Mass., assignor to Metals & Controls Corporation, Attleboro, Mass., a corporation of Massachusetts Application March 29, 1952, Serial No. 279,441

6 Claims. (Cl. 297—15)

This invention relates to snap-acting thermostatic elements, and in particular to inherently snap-acting thermostatic discs of the type having ears or tabs which extend from the disc.

In the manufacture and use of snap-acting thermostatic elements of the type having ears or tabs extending from the disc on which electrical contacts, for example, are mounted (such as, for example, are shown in United States Patent No. 2,317,831 issued to Victor G. Vaughan and John D. Bolesky) it has been found that whereas the snap-acting temperature response of the dished part of the device may be accurately controlled, nevertheless the ears of the device retain their creep motion characteristic of thermostat metal strips. This being the case, when such a device is mounted in a base for use as a movable part of an electric switch, it is sometimes difficult to adjust the device accurately as to operating snap temperature because of the creep motion of the ears or tabs as the thermostat is heated.

It is the general object of this invention, therefore, to provide a construction of such an eared element in which the creep motion of the ears is substantially eliminated, thus furnishing such an inherently snap-acting device which can be accurately adjusted to operate with a snap motion and without any creep opening being induced by the action of the ears.

Among the objects of the invention, therefore, may be noted the provision of a snap-acting thermostatic element having ears extending therefrom integral with the plate but in which said ears are compensated so as substantially to eliminate creep motion of the ears; the provision of a snap-acting thermostatic element in which the ears of the element are compensated against creep motion by the addition thereon of oppositely moving thermostatic metal; and the provision of a snap-acting thermostatic element which is simple and economical to make. Other objects will be in part obvious and in part pointed out hereinafter.

The invention accordingly comprises the elements and combinations of elements, steps and sequence of steps, features of construction, and arrangements of parts, which will be exemplified in the accompanying drawings, and the scope of the application of which will be indicated in the following claims.

In the drawings in which are illustrated several embodiments of the invention, and in which the thicknesses of the component parts have been greatly exaggerated in comparison to other dimensions for purposes of clarity:

Fig. 1 is a plan view of a sheet of bimetal showing in dotted lines how one embodiment of this invention may be blanked out of sheet stock in an initial stage of its manufacture;

Fig. 2 is a perspective view of a thermostatic element blanked out as indicated in Fig. 1;

Fig. 3 shows the blank of Fig. 1 after a bending operation has been performed thereon, and after the element has been dished for snap-action temperature response;

Fig. 4 is a cross section of the Fig. 3 embodiment, taken along the sight line 4—4;

Fig. 5 shows a plan view of another embodiment of this invention;

Fig. 6 is a cross sectional view of the Fig. 5 embodiment taken in the direction of sight line 6—6;

Fig. 7 is a perspective view of the Fig. 5 embodiment showing electrical contacts mounted thereon;

Fig. 8 is a cross section of a portion of the Fig. 7 embodiment, serving better to illustrate the relationship between components thereof; and Fig. 9 is a view similar to Fig. 8 showing a different arrangement of the components of the Fig. 7 embodiment.

Similar reference characters indicate corresponding parts throughout the various views of the drawings.

Referring now to the drawings for a detailed description of the invention:

In Fig. 1 there is illustrated a sheet of composite laminated thermostat metal 1 on which has been indicated in dotted lines thermostat elements 2 which are to be punched or blanked from sheet 1. Such material is well known in the art and comprises a sheet of metal having a relatively high coefficient of expansion firmly bonded to a sheet of metal having a relatively low coefficient of expansion. The resulting thermostatic element 2 is more clearly illustrated in Fig. 2 and comprises two sheet of metal 3 and 4 firmly bonded together as is customary in the art of manufacturing thermostat metal. In this instance, the metal 3 is the low expansion metal and the metal 4 is the high expansion metal. The thermostat element 2 in this instance comprises the disc-like portion 5 having integrally attached thereto the ears indicated generally by numeral 6. As indicated in Fig. 3, a portion 7 of each of ears 6 is bent back on the remaining portion 9 on bend lines 8 and 8. After the bending has been done, the free end of the bent-over portion 7 is welded, as indicated by the weld points 10, at several places in order to attach said free end to the portion 9 of the thermostatic element. A hole 11 is provided in the center of the device for mounting purposes, if desired.

Thus, the element so far described comprises the central disc-like portion 5 and ears 6 integrally attached thereto, each ear comprising the portion 9 which is an extension of the disc portion 5 and the portion 7 which has been bent to lie against portion 9. In this arrangement, it will be observed that the two high expansion layers 4 of portions 7 and 9 are lying adjacent each other and the two low expansion layers 3 of portions 7 and 9 are on the outside. When this device is now heated, with the high expansion and low expansion metals arranged as shown, there will be no tendency for either ear itself (independently of disc portion 5) to bend up or down, since any tendency of portion 9 to move in one direction will be counteracted by the tendency of portion 7 to move in the opposite direction. Thus there is no motion of the ears of the element other than that imparted to them when the dished central portion 5 snaps from one position of concavity to its other position of concavity.

Preferably after the portions 7 are welded to portions 9, the central part 5 of the device is dished to provide a non-developable surface such as will snap back and forth in response to temperature changes, as described in United States Patent 1,448,240.

Fig. 4 illustrates more clearly, by the cross sectional showing, the relationship of parts of the Fig. 3 snap-acting device, showing the two high expansion layers 4 adjacent each other and the low expansion layers 3 on the outside.

Referring now to Figs. 5 and 6, there are shown, respectively, plan and cross-sectional side views of another embodiment of the invention in which the additional compensating pieces of thermostat metal 12 and 12 are not initially blanked as an integral part of the thermostat element as a whole, but are separate pieces of thermostat metal welded to the eared portions 13 and 13 of the thermal element and serving exactly as before to compensate for any undesired motion of the ears 13 and 13. In this case, the thermostat metal pieces 12 are shaped to match the outline of the eared portions 13 to which they are to be attached, and then the portions 12 are attached in place as by welding. Preferably, these additional pieces 12 are made from metal having the same characteristics as the metal the main element is made from. In this case, as in the Figs. 1-4 embodiment, the relationship of the high expansion and low expansion sides of the respective thermostat metals is so arranged that any tendency of each of the ears 13 to move in one direction is counteracted by opposite tendency of the added piece 12. Again, in this embodiment, the two high expansion metals 4 and 4 are adjacent and the two low expansion metals 3 and 3 are on the outside.

Referring now to Fig. 7, there is shown a perspective view of the disc of Fig. 6 to which have been attached as by welding or soldering, the electrical contacts 14 and 14. The positioning of the thermostat metal pieces 12 and 12 is clearly shown in this drawing.

In Fig. 8 there is shown a cross section of one eared-portion of the Fig. 7 device, to show more clearly the relationship of parts, with the two low expansion metals 3 and 3 on the outside, and the two high expansion metals 4 and 4 adjacent to each other.

In Fig. 9 a view similar to Fig. 8 is given, but in this instance it will be noted that the additional pieces of metal 12 are fastened to the other side of the ears 13 of the element. Thus, in this Fig. 9 arrangement the two high expansion sides 4 of thermostat metal are on the outside and the two low expansion sides 3 are adjacent to each other. Again, as before, any tendency of ear 13 to move in one direction with temperature change is counteracted by an equal and opposite tendency on the part of piece 12.

This same Fig. 9 arrangement of parts can equally well apply to the Fig. 3 embodiment. In such a case, the portions 7 of the device would have been bent on the bend lines 8 to lie on the other side of the ear portions 9 rather than on the side shown in Fig. 3. It is to be clearly observed that if such positioning had been done, then (as in Fig. 9), the two low expansion metals would be adjacent to each other and the two high expansion metals would be the outer layers.

In respect to all of the embodiments, the ends 15 of ear portions 7 and the inner ends 16 of ear portions 12 are preferably curved so that when these compensating portions are fastened in place the curvature is such as to follow the projected curvature of the perimeter of central portion 5.

In view of the above, it will be seen that the several objects of the invention are achieved and other advantageous results attained. As many changes could be made in carrying out the above constructions without departing from the scope of the invention, it is intended that all matter contained in the above description or shown in the accompanying drawings shall be interpreted as illustrative and not in a limiting sense.

I claim:

1. A snap-acting thermostatic element comprising a composite thermostat metal sheet part having a non-developable surface adapted to change its shape suddenly upon reaching a predetermined temperature; ears of composite thermostat sheet metal attached to the periphery of said sheet part; and composite thermostatic metal parts overlying said ears and fastened thereto immovably with respect to said ears; the direction of unrestrained bending, in response to temperature change, of said parts being opposite to the direction of unrestrained bending, in response to the same temperature change, of said ears.

2. A snap-acting thermostatic element comprising a composite thermostat metal sheet part having a non-developable surface adapted to change its shape suddenly upon reaching a predetermined temperature; ears of composite thermostat sheet metal attached to the periphery of said sheet part as an integral part thereof; and integral extensions of said ears bent back to overlie said ears, and fastened thereto immovably with respect to said ears; the direction of unrestrained creep motion of said extensions upon a given temperature change being opposite to the direction of unrestrained creep motion of said ears for the same temperature change.

3. A snap-acting thermostatic element comprising a composite thermostat metal sheet part having a non-developable surface adapted to change its shape suddenly upon reaching a predetermined temperature; first ears of composite thermostat sheet metal attached to the periphery of said sheet part as an integral part thereof; and second ears of composite thermostat sheet metal overlying said first ears and attached thereto immovably with respect to said first ears, the high expansion metal component of each of said second ears lying adjacent to the high expansion metal component of its respective first ear.

4. A snap-acting thermostatic element comprising a composite thermostat metal sheet part having a non-developable surface adapted to change its shape suddenly upon reaching a pre-determined temperature; first ears of composite thermostat sheet metal attached to the periphery of said sheet part as an integral part thereof; and second ears of composite thermostat sheet metal overlying said first ears and attached thereto immovably with respect to said first ears, the low expansion metal component of each of said second ears lying adjacent to the low expansion metal component of its respective first ear.

5. An inherently snap-acting thermostatic element comprising a central disc-like portion having a non-developable surface adapted to change its shape suddenly upon reaching a pre-determined temperature; two first ears formed as integral parts of said central portion and extending from the rim thereof at opposite ends of a diameter; and second ears of composite thermostat metal overlying said first ears and attached thereto immovably with respect to said first ears to counteract any creep-motion of said first ears, the direction of motion of said second ears for a given temperature change being opposite the direction of motion of said first ears for the same temperature change.

6. The disc of claim 5, in which said second ears are integral extensions of said first ears, said extensions being folded back over said first ears to lie adjacent thereto.

References Cited in the file of this patent

UNITED STATES PATENTS

| Number | Name | Date |
|---|---|---|
| 2,317,831 | Vaughan | Apr. 27, 1943 |
| 2,487,684 | Smith | Nov. 8, 1949 |
| 2,533,274 | Matulaitis | Dec. 12, 1950 |